United States Patent [19]

Mitani et al.

[11] Patent Number: 4,641,964
[45] Date of Patent: Feb. 10, 1987

[54] APPARATUS FOR MEASURING OPTICAL CHARACTERISTICS OF OPTICAL SYSTEMS

[75] Inventors: Kiyoharu Mitani, Kawasaki; Kazuo Morohashi, Tokyo; Kenji Yamada, Narashino; Tsunemi Gonda, Yamato; Hideo Mizutani, Yokohama, all of Japan

[73] Assignee: Nippon Kogaku K. K., Tokyo, Japan

[21] Appl. No.: 632,866

[22] Filed: Jul. 20, 1984

[30] Foreign Application Priority Data

Jul. 27, 1983 [JP] Japan ................... 58-137376

[51] Int. Cl.$^4$ ............................... G01B 9/00
[52] U.S. Cl. ........................... 356/124; 356/127
[58] Field of Search ............... 356/124, 125, 126, 127

[56] References Cited

U.S. PATENT DOCUMENTS

4,275,964  3/1981  Vassiliadis ..................... 356/125
4,329,049  5/1982  Rigg et al. ..................... 356/124
4,410,268  10/1983  Tamaki ......................... 356/124

Primary Examiner—R. A. Rosenberger
Attorney, Agent, or Firm—Shapiro and Shapiro

[57] ABSTRACT

An apparatus which comprises a collimating lens, light source means for selectively forming light sources in two positions on the optical axis of the collimating lens, means for defining the position of the lens to be inspected opposite to the light source with respect to the collimating lens, a mask plate having translucent or opaque areas symmetrical to the optical axis, a relay lens for placing the mask plate at a position conjugate with the lens position, an imaging lens positioned opposite to the mask plate with respect to the relay lens, and photoelectric converting means for producing image signals corresponding to the positions, in a plane perpendicular to the optical axis, of the image of the translucent or opaque areas of the mask plate formed by the imaging lens.

5 Claims, 8 Drawing Figures

APPARATUS FOR MEASURING OPTICAL CHARACTERISTICS OF OPTICAL SYSTEMS

BACKGROUND OF THE INVENTION

1. Field of the Invention

The present invention relates to an apparatus for measuring refractive characteristics such as spherical power, cylindrical power, prism power etc. of an optical system, said apparatus being applicable for example to a so-called automatic lens-meter for automatically measuring the refractive characteristics of a spectacle lens or the like.

2. Description of the Prior Art

Recently there have been proposed various apparatus for use as an automatic lens-meter. These apparatus generally rely on a principle of introducing a parallel light beam into an optical system to be inspected, photoelectrically detecting the deviation of the beam deflected by the refractive characteristics in passing said optical system and determining the refractive characteristics from said deviation.

For example, the U.S. Pat. No. 4,275,964 discloses an apparatus in which a parallel light beam is guided through the optical system to be inspected and a diaphragm having annular apertures and positioned close to said optical system into a photosensor array, the refractive power of said optical system in a radial direction corresponding to the direction of the photoreceptor elements of said array being determined from the distances of the light images falling on said array.

However, such apparatus is unable to measure said distances accurately since the light images falling on the photosensor array mutually overlap in case the light source of the apparatus is approximately conjugate with the photosensitive plane of the photoreceptor elements with respect to an optical system composed of the optical system belonging to the apparatus and the optical system to be inspected.

SUMMARY OF THE INVENTION

An object of the present invention is to provide an apparatus for measuring optical characteristics capable of appropriate measurement even in case the optical system to be inspected has only weak refractive characteristics.

The foregoing object is achievable according to the present invention by an apparatus which comprises a collimating lens; light source means for selectively forming light sources at two positions on the optical axis of said collimating lens; means for defining the position of the lens to be inspected opposite to said light source with respect to the collimating lens; a mask plate having translucent or opaque areas symmetrical to the optical axis; a relay lens for placing said mask plate at a position conjugate with said lens position; an imaging lens positioned opposite to said mask plate with respect to the relay lens; and photoelectric converting means for producing image signals corresponding to the positions, in a plane perpendicular to the optical axis, of the images of the translucent or opaque areas of the mask plate formed by said imaging lens.

DETAILED DESCRIPTION OF THE PREFERRED EMBODIMENTS

Figure 1:
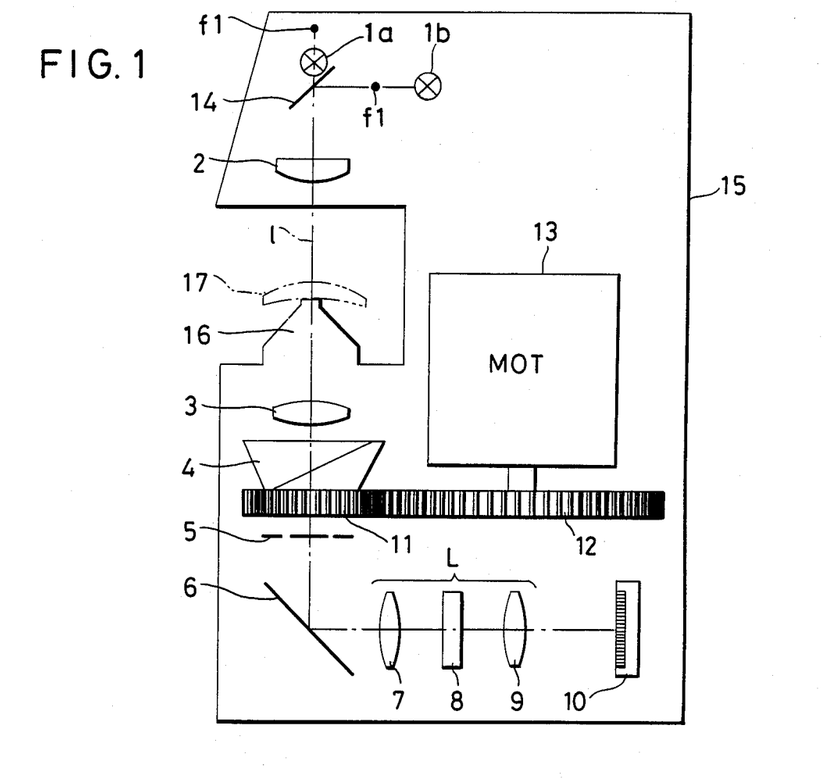
FIG. 1 is a schematic view of an embodiment of the present invention applied to an automatic lens-meter.
Figure 2:
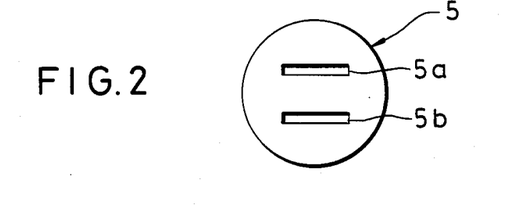
FIG. 2 is a plan view of a mask plate employed in the embodiment shown in FIG. 1.
Figure 3:
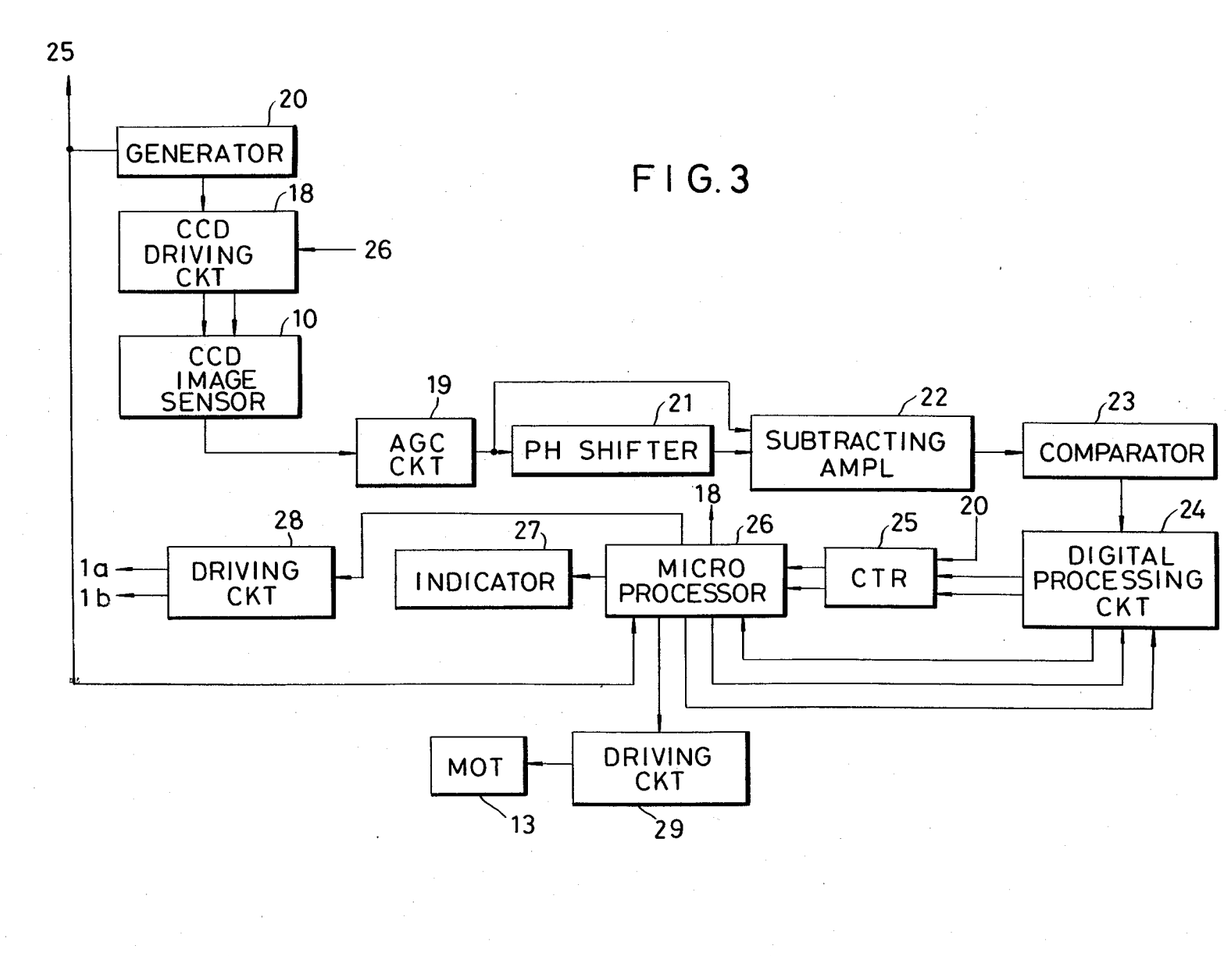
FIG. 3 is an electrical block diagram of the embodiment shown in FIG. 1.

Now reference is made to FIG. 1 showing a schematic view of an embodiment of the present invention applied to an automatic lens-meter, FIG. 2 showing a plan view of a mask plate employed in the embodiment shown in FIG. 1, and FIG. 3 showing an electrical block diagram of the automatic lens-meter shown in FIG. 1.

A light source 1a is positioned on an optical axis 1, and a light beam emerging therefrom enters a collimating lens 2 through a half mirror 14. Another light source 1b is positioned on the optical axis 1 deflected by the half mirror 14, and the light beam emerging from said light source 1b also enters the collimating lens 2 after being reflected by the half mirror 14. The front focus f1 of the collimating lens 2 is positioned between the light sources 1a and 1b, which are therefore separated by a determined distance in such a manner that the light source 1a is closer to the collimating lens 2 than the front focus f1 while the light source 1b is farther from the collimating lens 2 than the front focus f1. The light emerging from the collimating lens 2 is emitted from a casing 15, then passes a lens 17 to be inspected, placed on a support 16, and again enters the casing 15. The support 16 is so constructed that the inspected lens 17 is positioned approximately at the rear focus of the collimating lens 2. Consequently the position of the light source is linearly related with the diopter of the light beam entering the inspected lens 17. A relay lens 3 is provided in such a manner that the inspected lens 17 is conjugate with a mask plate 5. Between the relay lens 3 and the mask plate 5 there is provided an image rotator 4 which is rotated by a motor 13 through gears 11, 12. As shown in FIG. 2, the mask plate 5 is provided with rectangular slits 5a, 5b symmetrical to the optical axis 1. The light transmitted by the inspected lens 17 reaches a mirror 6 through the relay lens 3, image rotator 4, and slits 5a, 5b of the mask plate 5. On the reflected light path of the mirror 6 there is positioned an imaging lens system L composed of lenses 7, 8, 9. Consequently the light reflected by the mirror 6 is guided through the imaging lens system L and is focused on an image sensor 10 composed of a linear charge-coupled device (CCD). The photoreceptor plane of the image sensor 10 is conjugate with the focal position f1 with respect to an optical system composed of the collimating lens 2, relay lens 3, image rotator 4, mirror 6 and imaging lens system L. The rear focal position of the relay lens 3 coincides with the front focal position of the lens 7, and the image sensor 10 is positioned at the rear focal position of the lens 9. Cylindrical lens 8 does not have a refractive power in the direction of the array of the image sensor 10 but has a refractive power in the direction perpendicular thereto, and the synthesized focal position of the lens 7 and the cylindrical lens 8 falls on the mask plate 5. Consequently, the image sensor 10 is optically conjugate with the mask plate 5, whereby the image of the slits can always be formed on the image sensor 10 even when the light beam is deflected by a prism power of the inspected lens 17.

As shown in FIG. 3, the image sensor 10 is driven by a known driving circuit 18 to supply image signals to an automatic gain control (AGC) circuit 19. In response to clock pulses supplied from a generator 20, the driving circuit 18 supplies the image sensor 10 with a start pulse and ensuing scanning pulses. The start pulse is generated by instructions from a microprocessor 26. The output signal of the AGC circuit 19 is supplied to a phase shifter 21 and also to an input terminal of a subtracting amplifier 22, of which the other input terminal receives the output of said phase shifter 21. Consequently, the subtracting amplifier 22 produces an amplified signal corresponding to the difference of the output signal of the AGC circuit 19 and a signal obtained by shifting said output signal by a time $\Delta t$. The output signal of the subtracting amplifier 22 is supplied to a zero-cross comparator 23 having a hysteresis, which converts an analog signal into a digital signal with different threshold levels according to whether the input signal is increasing or decreasing. Output pulses of the zero-cross comparator 23 are supplied to a digital processing circuit 24 composed of three bistable multivibrators as will be explained in more detail later in relation to FIGS. 4 and 5. Said digital processing circuit 24 outputs a gate signal corresponding to the interval of the input pulses and an NP signal indicating whether there are observed one or two slit images. The gate signal from the digital processing circuit 24 is supplied to a counter circuit 25, which is for example composed of an AND gate and a pulse counter for counting the period of the entered gate signal by means for example of clock pulses supplied from the generator 20.

The NP signal from the digital processing circuit 24 is supplied to the microprocessor 26, which also receives the count of the counter 25 and the clock pulses from the generator 20 and which determines which of the light sources 1a and 1b is to be lighted, supplies a signal to a driving circuit 28 of the light sources to instruct which of the light sources is to be turned on, measures the optical characteristics of the inspected lens 17 from the count of the counter 25, and displays the obtained result on a display circuit 27.

Upon completion of the measurement along a radial direction of the inspected lens 17, the microprocessor 26 supplies a signal to a motor driving circuit 29 for rotating the image rotator 4 by a determined amount in order to conduct the measurement along another radial direction. The motor 13 is composed for example of a stepping motor which is rotated by a determined amount in response to the signal from the motor driving circuit 29, whereby the image rotator 4 is rotated by a determined amount through the gears 11, 12.

Figure 4:
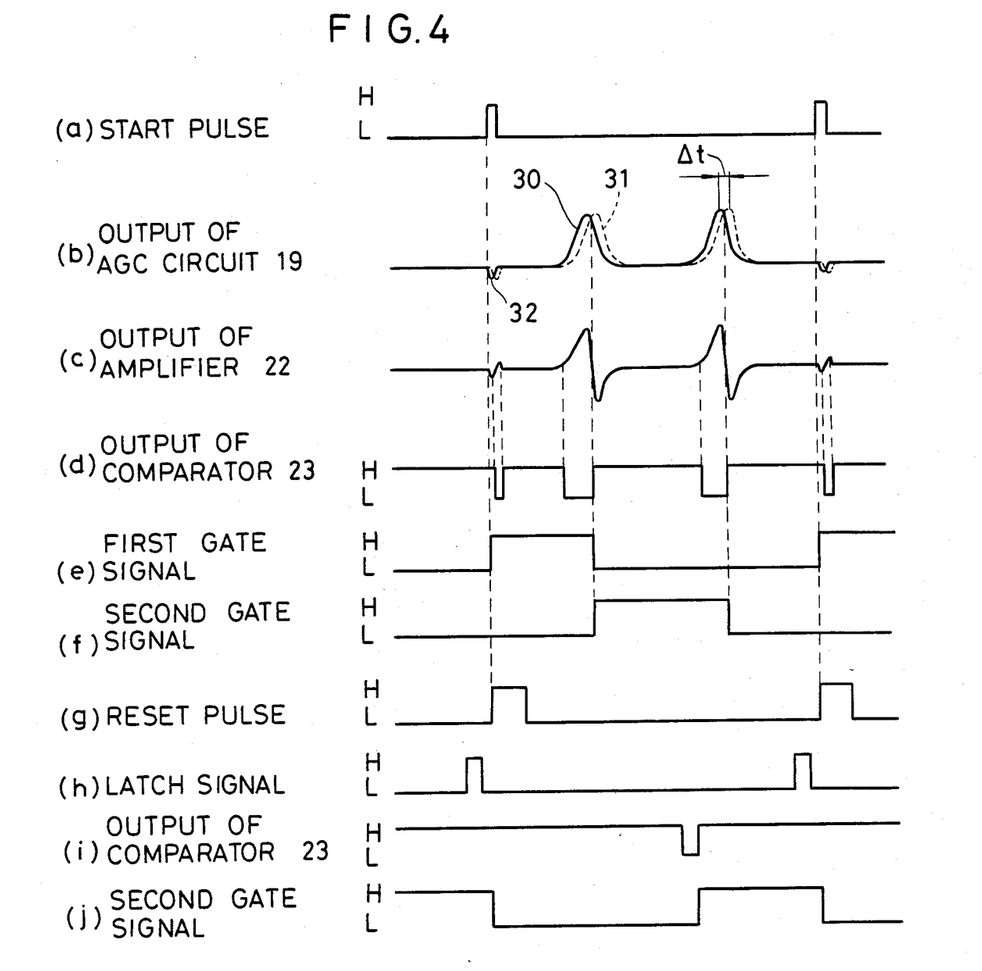
FIG. 4 is a timing chart of the circuit shown in FIG. 3.

Now reference is made to a timing chart shown in FIG. 4, for explaining the function of the apparatus of the present invention. In the following description, the high and low levels of digital signals are respectively represented as H and L levels. By turning on a power switch (not shown) after a lens 17 to be inspected is placed on the support 16, the light source 1a is turned on under the command by the microprocessor 26. The light from the light source 1a is transmitted through the half mirror 14, inspected lens 17, relay lens 3, mask plate 6, mirror 6 and imaging lens system L and reaches the image sensor 10. The light source 1a is suitable in case the inspected lens is a strong positive lens, since it supplies a diverging light beam to the inspected lens 17. On the other hand, the light source 1b is suitable in case the inspected lens is a strong negative lens, since it provides a converging beam to the inspected lens 17. Thus, there are formed two slit images on the photoreceptor elements of the image sensor 10, corresponding to the slits of the mask plate 5. (However, for a certain refractive power of the inspected lens 17, the photoreceptor elements of the image sensor 10 become conjugate with the light source 1a with respect to the lenses 2, 17, 3 and L, and two slit images mutually overlap in such case.) Thus the interval of the two slit images is related with the refractive power of the inspected lens 17. If the crossing point of the image sensor 10 and the optical axis 1 is taken as the original point of a coordinate system and the direction of the array of photoreceptor elements in the image sensor 10 is so selected as to be perpendicular to the slit images in case the inspected lens 17 is a spherical lens, the crossing points of said slit images and the array for a lens 17 with aberrations will be same as those for a spherical lens of the same refractive power. However, the slit images of such aberrated lens, though remaining mutually parallel, rotate about the optical axis by an angle corresponding to said aberration. On the other hand, if the inspected lens has a prism power, the slit images move in parallel in the direction of said prism power. Thus, by taking the y-axis in the direction of the array of the photoreceptor elements, and assuming that the slit images fall on the photoreceptor elements at the positions $y_1$ and $y_2$, there is obtained a relationship $y_1 = -y_2$ for a spherical lens 17 and the distance $y_1 - y_2$ of the slit images corresponds to the spherical power in the y-direction of the inspected lens 17. Also if the inspected lens 17 has a prism power, a value $(y_1 + y_2)/2$ corresponds to the component in the y-direction of said prism power.

The photoreceptor elements of the image sensor 10 are driven, in successive manner, by the start pulse and ensuing clock pulses (FIG. 4A) supplied from the driving circuit 18, whereby the AGC circuit 19 produces an image signal with two peaks as shown by a full line 30 in FIG. 4B. Said signal is delayed by a time $\Delta t$, as represented by a broken line 31 in FIG. 4B, by means of the phase shifter 21. The delay time $\Delta t$ of the phase shifter 21 can be arbitrarily varied by a known technology, so that the detection sensitivity of the peak positions can be adjusted. The subtracting amplifier 22 produces a signal (FIG. 4C) corresponding to the difference between the full line 30 and the broken line 31 shown in FIG. 4B. The function of the phase shifter 21 and the subtracting amplifier 22 is equivalent to a case of passing the output signal of the AGC circuit through a differentiating circuit for peak detection, but the S/N ratio can be improved by a suitable selection of $\Delta t$ in comparison with the simple use of the differentiating circuit. The signal shown in FIG. 4C is converted, by means of the zero-cross comparator 23, into digital signals as shown in FIG. 4D. The zero-cross comparator 23 is provided with so-called hysteresis, showing different threshold levels respectively for an input signal changing from negative to positive and for an input signal changing from positive to negative, so that the output signal assumes the H-level for an input signal changing from zero to positive as shown in FIG. 4C, the L-level for an input signal changing from positive to negative but no change for an input signal changing from negative to zero. The digital signal shown in FIG. 4D is supplied to the digital processing circuit 24, which outputs a first gate signal (FIG. 4E) of a duration from the start signal to a peak corresponding to the first slit image, a second gate signal (FIG. 4F) of a duration from the peak corresponding to the first slit image to the peak corresponding to the second slit image, and an NP signal whether one or two slit images are detected.

Figure 5:
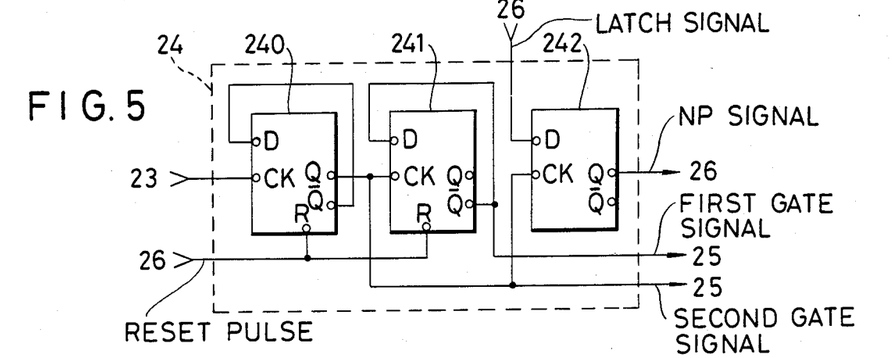
FIG. 5 is a detailed block diagram of a digital processing circuit shown in FIG. 3.

Now reference is made to FIG. 5 for explaining the digital processing circuit 24. Said circuit 24 is provided with bistable multivibrator 240, 241, 242. The bistable multivibrator 240 receives the output signal of the zero-cross comparator 23 through a clock input terminal CK, and a reset pulse (FIG. 4G) formed by the start pulse (FIG. 4A) through the reset terminal R. Consequently, the bistable multivibrator 240 outputs the second gate signal as shown in FIG. 4F from the Q-output terminal. Since the Q-output terminal of the bistable multivibrator 240 remains at the L-level during the reset pulse (FIG. 4G) received through the reset terminal R, the noise caused by the dummy elements in the image sensor 10 (32 in FIG. 4B) is eliminated, and the obtained output signal assumes the H-level at the first rise of the output signal of the zero-cross comparator 23 shown in FIG. 4D and falls to the L-level at the next rise. The duration of the H-level of the thus obtained second gate signal corresponds to the distance between the first and second slit images. The Q-output terminals of the bistable multivibrator 240 is connected to one of the output terminals of the digital processing circuit 24, and is also connected to the clock input terminal CK of the bistable multivibrator 241 and the clock input terminal CK of the bistable multivibrator 242. The reset terminal R of the bistable multivibrator 241 receives the reset pulse (FIG. 4G). Consequently, the $\overline{Q}$-output terminal of the bistable multivibrator 241 assumes the H-level upon entry of the reset pulse (FIG. 4G) to the reset terminal R, and assumes the L-level at the start of the second gate signal. The $\overline{Q}$-output terminal of the bistable multivibrator 241, outputs the first gate signal, and is connected to one of the output terminals of the digital processing circuit 24. The duration of the H-level of the first gate signal thus obtained corresponds to the distance from the start pulse to the first slit image.

The bistable multivibrator 242 receives, through the D-input terminal thereof, a latch signal as shown in FIG. 4H supplied from the microprocessor 26, which generates said latch signal (FIG. 4H) prior to the start pulse (FIG. 4A). Consequently, the Q-output terminal of the bistable multivibrator 242 outputs the second gate signal (FIG. 4F) corresponding to a state under entry of the latch signal (FIG. 4H). The Q-output terminal assumes the L-level in the presence of two slit images, but assumes the H-level in the presence of only one slit image (the second gate signal in this state being shown in FIG. 4J). Thus FIG. 4F shows the second gate signal in the presence of two slit images as shown in FIG. 4D, in which it is at the L-level during the presence of the latch signal (FIG. 4H), while FIG. 4J shows the second gate signal in the presence of only one slit image as indicated by the output signal of the zero-cross comparator, in which it is at the H-level during the presence of the latch signal (FIG. 4H). The Q-output terminal of the bistable multivibrator 242 outputs the NP signal. The counter 25 is provided with two counting units, which respectively measure the durations of the H-level of the first gate signal (FIG. 4E) and of the second gate signal (FIG. 4F), in terms of the number of clock pulses of the generator 20. The counts of the counter 25 are supplied to the microprocessor 26.

Figure 6:
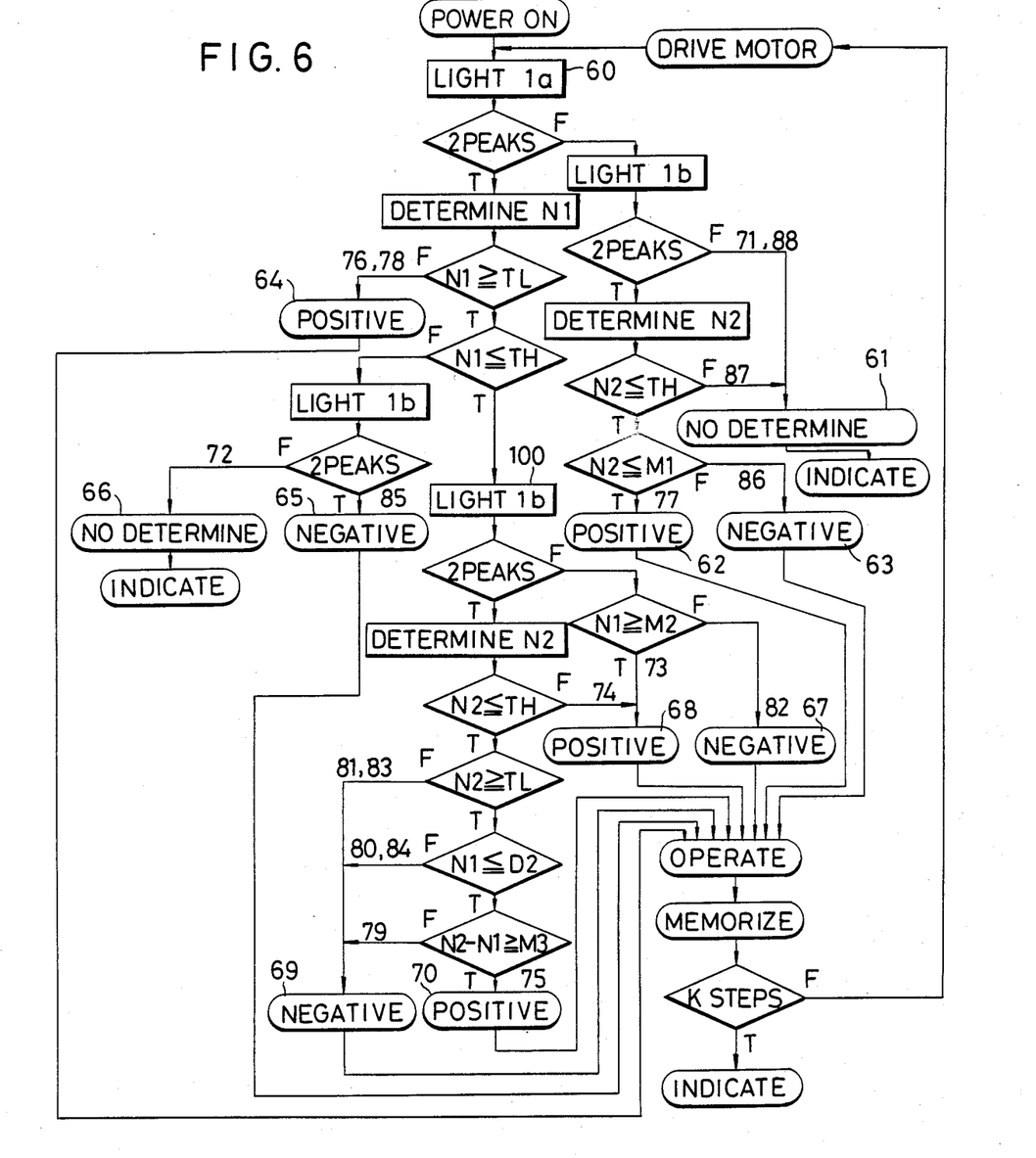
FIG. 6 is a flow chart of a microprocessor shown in FIG. 3.

FIG. 6 shows a basic flow chart of the microprocessor 26. Now reference is made also to FIGS. 7 and 8 for explaining the relationship between the count of the duration of the second gate signal (FIG. 4F) obtained in the counter 25 and the spherical power.

Figure 7:
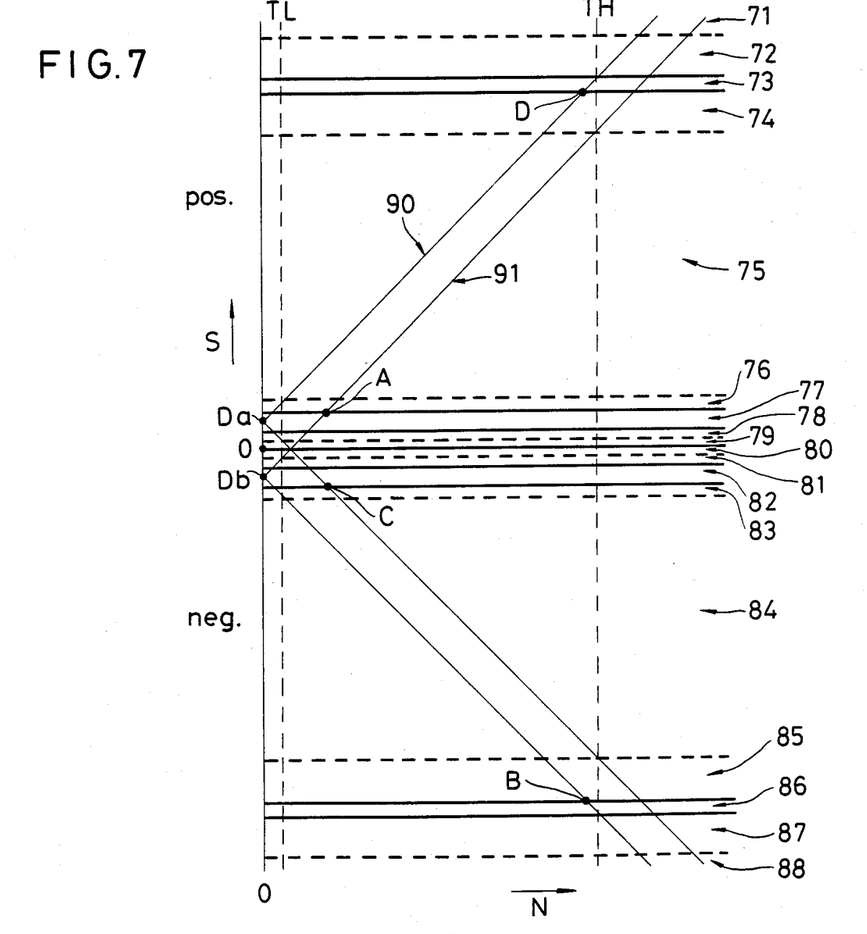
FIG. 7 is a chart showing the relationship between the count N of a counter and the spherical power S of the inspected lens, employed as the basis for preparing the flow chart shown in FIG. 6.

The position of the light source 1a or 1b is so selected that the light beam therefrom falls, in the absence of the inspected lens 17 in the optical system shown in FIG. 1, on the image sensor 10 through the mask plate 5, providing sufficiently separate two peaks in the obtained signal. However, in the actual measurement, if the distance of the two peaks is very small, the detected distance of two peaks becomes smaller than the actual distance because of the overlapping effect of two peaks. In order to avoid such phenomenon, the microprocessor 26 is provided with a lower threshold value TL for the count N. Also an upper threshold value TH is provided as the peak positions cannot be exactly detected if the slit images are formed on both ends of the image sensor 10. FIG. 7 shows these threshold values TL, TH in graphic presentation.

Figure 8:
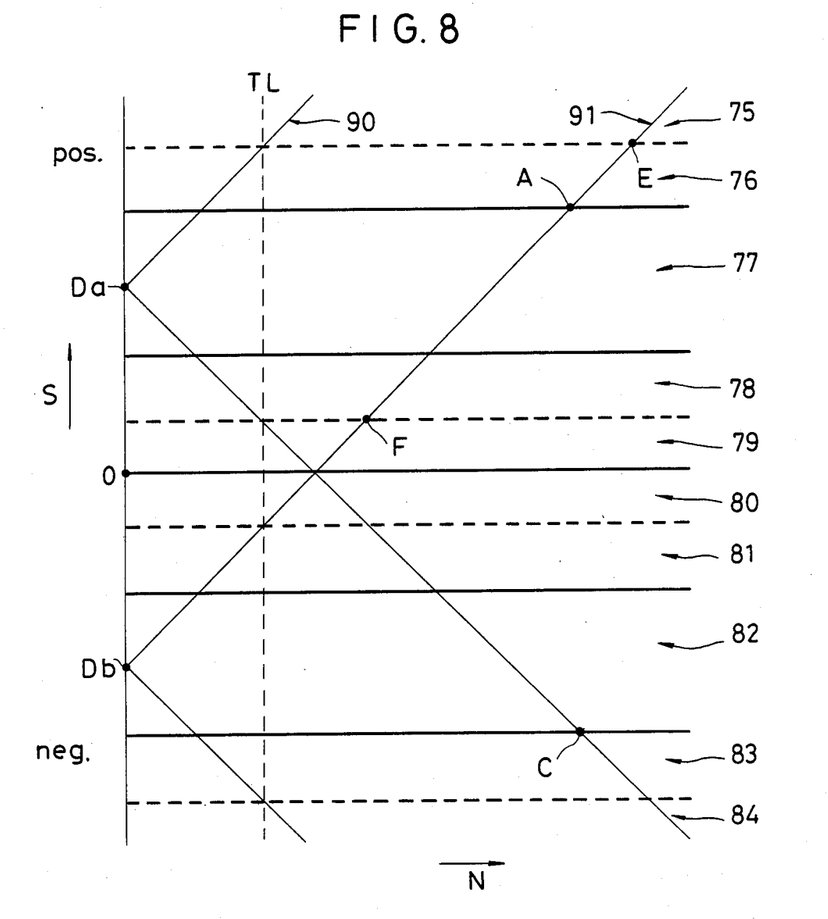
FIG. 8 is a partial magnification of FIG. 7.

In FIGS. 7 and 8, the abscissa represents the count N of the counter 25 corresponding to the distance of two peak signals based on the second gate signal, while the ordinate represents the spherical power S of the inspected lens 17 corresponding to said count N, wherein a curve 90 represents characteristics obtained by the light source 1a, and a curve 91 represents characteristics obtained by the light source 1b. Da represents a refractive power of the lens 17 at which the image sensor 10 becomes conjugate with the light source 1a, and Db represents a refractive power of the lens 17 at which the image sensor 10 becomes conjugate with the light source 1b. The front focal position $f_1$ of the relay lens 3, being positioned in the middle between the light sources 1a and 1b, becomes conjugate with the CCD image sensor 10 in the absence of the lens 17 to be inspected. In FIG. 7, areas 71 to 88 are identified by the microprocessor 26 by the flow chart shown in FIG. 6, as will be explained in the following.

After the start of power supply, the light source 1a is at first turned on (step 60). In a case where two peaks are not detected in the signal obtained by scanning with the image sensor 10, the spherical power S is in one of the areas 71, 77, 86, 87, 88 in FIG. 7. Thus the light source 1a is turned off. Then, if two peaks cannot be detected in a similar measurement with the light source 1b, the spherical power lies either in the area 71 or 88, and the further measurement is not possible (step 61). Also, even if two peak signals are detected in the measurement with the light source 1b, the measurement is considered not possible in case the obtained count N2 exceeds the upper threshold value TH (area 87) (step 61). In case of $N_2 \leq TH$, there is selected an arbitrary value $M_1$ between the count of point A (crossing point of the line 91 and the boundary of areas 76 and 77) and the count of point B (crossing point of the line 91 and the boundary of areas 85 and 86). If $N_2 \leq M_1$, the spherical power is in the area 77, has a positive sign and is determined from the measurement with the light source 1b (step 62). If $N_2 > M_1$, the spherical power S is in the area 86, has a negative sign and is determined from the measurement with the light source 1b (step 63). If two peak signals are identified in the measurement with the light source 1a, there can be considered the following three cases according to the count $N_1$. If $N_1 < TL$, the spherical power is in the area 76 or 78 and is determined, with a positive sign, from the count measured with the light source 1b (step 64). If $N_1 > TH$, the spherical power S is in the area 72 or 85. Thus, if two peak signals are found in the measurement with the light source 1b, the power S is in the area 85 and is determined, with a negative sign, from the count measured with the light source 1b (step 65). On the other hand, if said signals are not detected, the power is in the area 72, and the measurement is no longer possible in this case (step 66). If $TL \leq N_1 \leq TH$ and two peak signals cannot be detected in the measurement with the light source 1b, the power is in the area 73 or 82, and an arbitrary value $M_2$ is selected between the count of point C (crossing point of the line 90 and the boundary of areas 82 and 83) and the count of point D (crossing point of the line 90 and the boundary of areas 73 and 74). If $N_1 < M_2$, the spherical power S is in the area 82, and is determined, with a negative sign, from the count measured with the light source 1a (step 67). If $N_1 \geq M_2$, the power S is in the area 73, and is determined, with a positive sign, from the count measured with the light source 1a (step 68). If $TL \leq N_1 \leq TH$ and two peak signals are detected in the measurement with the light source 1b, the power is in the area 74 in case of $N_2 > TH$ (step 68). On the other hand, in case of $N_2 < TL$, the power is in the area 81 or 83 and is determined, with a negative sign, from the count measured with the light source 1a (step 69). Then, in case of $TL \leq N_1 \leq TH$ and $TL \leq N_2 \leq TH$, the spherical power is in the area 75, 79, 80 or 84, and, further if $N_1 > N_2$, the power is in the area 80 or 84 (step 69). In the area 75, the maximum value of $N_2 - N_1$ is represented by $Ne - TL$ wherein $Ne$ is the count of point E (crossing point of the line 91 and the boundary of areas 75 and 76) shown in FIG. 8 (theoretically $N_2 - N_1 = Ne - TL =$ constant in the area 75), while in the area 79 the maximum value of $N_2 - N_1$ is represented by $Nf - TL$ wherein $Nf$ is the count of point F (crossing point of the line 91 and the boundary of areas 78 and 79) shown in FIG. 8. Thus if $N_2 - N_1 \geq M_3$ wherein $M_3$ is an arbitrary number between $Ne - TL$ and $Nf - TL$, spherical power is in the area 75 and is determined, with a positive sign, from the count measured with the light source 1a (step 70), and, if $N_2 - N_1 < M_3$, the power is in the area 79 (step 69).

Thus, though there exist two spherical powers for a certain count N as shown in FIG. 7, the microprocessor 26 is capable of selecting either one according to the flow chart shown in FIG. 6. The microprocessor 26 stores the thus determined spherical power in a memory (not shown).

Upon completion of the measurement in a radial direction in the above-explained manner, the microprocessor 26 generates a signal for causing, as explained before, the motor driving circuit 29 to rotate the motor by one step. Then the above-described measurement is repeated after the radial direction of measurement is displaced by one step.

Upon completion of the measurements of predetermined K times, the microprocessor 26 determines the position of the middle point of the crossing points of the image sensor 10 with two slit images from the counts of the counter 25 corresponding to the first and second gate signals, and compares said position with a reference value to discriminate whether the inspected lens 17 is a spherical lens or has a prism power or other aberrations, to calculate the optical characteristics and to supply a signal to the display circuit 27 for displaying the result of calculation on the display circuit 27. The ratio of the gears 11, 12 is so selected that the image rotator 4 rotates by 360° after the steps of K times of the motor 13.

Since the refractive characteristics of the inspected lens 17 are generally continuous in the rotary direction of the image rotator 4, the spherical power remains in the same area or only moves to a neighboring area among the areas 71-88 shown in FIG. 7 if the scanning of the image sensor 10 after rotation of the image rotator 4 is compared with the preceding scanning. More specifically, if the spherical power in a scan is in the area 75, the spherical power in a second scan will be in the area 74, 75 or 76. Consequently, for the same lens to be inspected, the data processing according to the flow chart shown in FIG. 6 needs to be conducted only once, and the ensuing processes can be conducted in a simpler manner.

As will be understood from FIG. 7, when the inspected lens 17 has a positive spherical power, the count obtained with the light source 1b is larger than the count with the light source 1a, and the relation is opposite when the inspected lens 17 has a negative spherical power.

The foregoing embodiment has been applied to an automatic lens-meter in which the microprocessor 26 has the function of identifying positive spherical power or negative power by lighting either one of two light sources, calculating the optical characteristics from the obtained peak distance and producing various control signals, but such functions may also be conducted by an operator under visual observation of the output signals of the CCD image sensor 10.

Also, in the embodiment shown in FIG. 1, the light source 1b is provided in an optical path branched by a half mirror 14, but it is naturally possible also to provide the light source 1b behind the light source 1a when seen from the lens 2.

The light sources 1a, 1b constituting a selective light source need not be positioned across the rear focal position f1 of the collimating lens 2, but may be positioned arbitrarily as long as they are spaced by a determined distance on the optical axis of the collimating lens 2. A change in the position of the light sources 1a, 1b only causes a parallel displacement of the lines 90, 91, shown in FIG. 7, in the direction of power. Also said two light sources may be replaced by a light source having the effect of constituting two light points spaced by a determined distance along the optical axis. More specifically the light from a light source may be split into two paths of different optical path lengths which can be suitably selected. In the structure shown in FIG. 1, it is possible to omit the light source 1b, to provide a half mirror perpendicular to the half mirror 14 at a position between the collimating lens 2 and the half mirror 14, thereby deflecting the optical axis of the collimating lens 2, deflected perpendicularly by said mirror, with two mirrors and thus introducing said path into the half mirror 14 in such a manner as to overlap with the optical axis 1 transmitted by the half mirror 14, and selecting either of the optical paths, with a suitable shutter. It is also possible to form two light points from a light source by inserting a positive or negative lens for example between the position of the half mirror 14 and the collimating lens 2 and eliminating the half mirror 14. It is furthermore possible to widen the range of measurement by providing three or more light sources, from which two light sources are suitably selected.

Although the optical system shown in FIG. 1 is preferable in the exploitation of the present invention, the essential factors therein are to form light sources in two positions on the optical path of the collimating lens 2, to project the light from the light source on the inspected lens 17 by means of the collimating lens 2, to form translucent or opaque areas at least in two peripheral positions of the inspected lens 17 (in FIG. 2 the areas 5a, 5b are opaque while the remaining area is translucent), wherein said translucent or opaque areas need not be rectangular but may assume other shapes such as a circle, to provide a position-detecting photoelectric converter such as an image sensor having a photoreceptor plane perpendicular to the optical axis, and to provide an imaging lens for forming the image of said translucent or opaque areas on the photoreceptor plane of the photoelectric converting element, whereby the blur of the image of the light source on the photoelectric converting element caused by the refractive power of the inspected lens 17 is represented by a change in the distance of the images of said translucent or opaque areas, and whereby a range of measurement which is difficult to cover with one light source can be covered with the other light source. Also whether the lens 17 has a negative or positive power can also be identified by the selective use of a light source.

We claim:

1. An apparatus for measuring an optical characteristic of an optical system to be inspected, comprising:
   (a) a converting optical system having a determined focal point and capable of converting a light beam diverging from said focal point into a parallel beam;
   (b) light source means for selectively generating light from either one of two positions on the optical axis of said converting optical system;
   (c) mask means positioned opposite to said light source means with respect to said converting optical system, wherein said mask means comprises a pattern composed of translucent and opaque areas, in which said pattern is symmetrical with respect to the optical axis of said converting optical system;
   (d) means for placing said inspected optical system on the optical axis of said converting optical system in such a manner as to guide the light of said light source means from said converting optical system to said mask means;
   (e) detecting means with a photoreceptor plane used for detecting the light intensity distribution on said photoreceptor plane; and
   (f) an optical system for guiding the light from said light source means through said mask means to said photoreceptor plane.

2. An apparatus according to claim 1, wherein said light source means comprises two light sources positioned along the optical axis of said converting optical system, wherein one of said two light sources is positioned between said determined focal position and said converting optical system and the other of said two light sources is positioned at the opposite side of said converting optical system with respect to said determined focal point.

3. An apparatus according to claim 2, wherein said light source means comprises means for selectively driving said two light sources.

4. An apparatus according to claim 1, wherein said light source means comprises two light sources placed on the optical axis of said converting optical system and said detecting means produces outputs in accordance with said detected light intensity distribution.

5. An apparatus according to claim 4, which further comprises calculating means for calculating an optical characteristic of said inspected optical system in accordance with said outputs which are produced in respose to the light of one of said two light sources and said outputs which are produced in response to the light of the other of said two light sources.

* * * * *